Patented Apr. 30, 1935

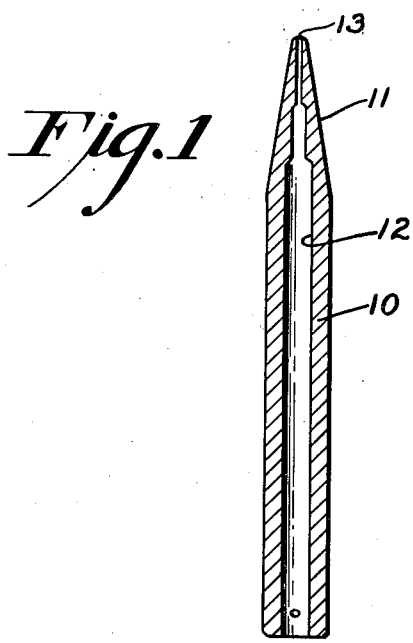
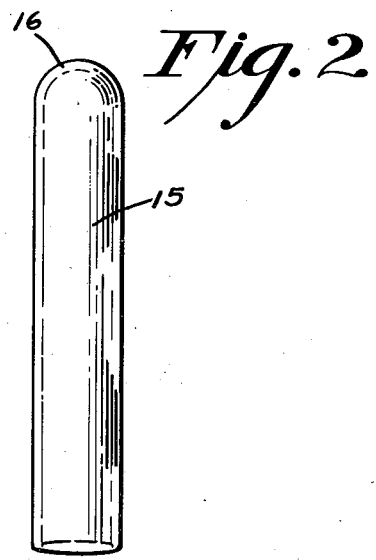
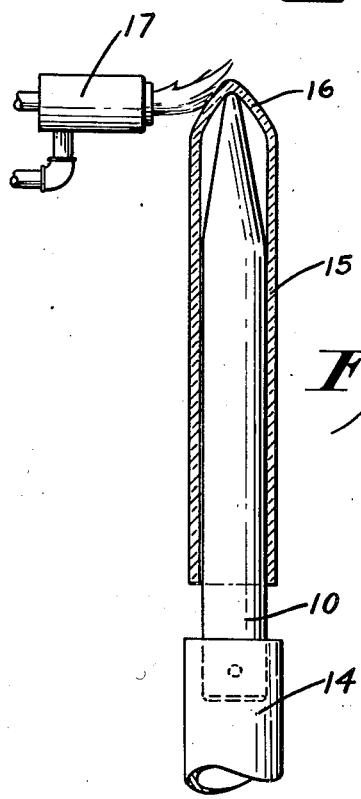
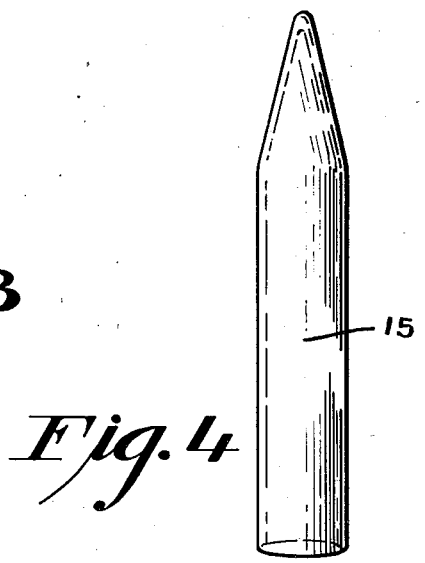

1,999,525

UNITED STATES PATENT OFFICE 1,999,525

SHAPING GLASS

John F. Morscholz, Corning, N. Y., assignor to Corning Glass Works, Corning, N. Y., a corporation of New York Application June 2, 1933, Serial No. 674,106

3 Claims. (Cl. 49—84)

This invention relates to shaping glass and more particularly to a method of making glassware of accurate internal form.

By ordinary methods of producing glassware such as drawing, blowing, pressing and the like it is impossible to obtain absolutely accurate internal size and shape and as a result the use of glass articles has been somewhat restricted. For instance, while glass due to its low thermal conductivity, its low coefficient of friction and its high resistance to abrasion is an ideal material from which to make bearings for high speed service such as is encountered in electric motors, it has not found wide acceptance in such fields for the reason that much difficulty has heretofore been experienced in producing glass articles such as bearings having sufficiently accurate internal diameters. In other fields such as in the manufacture of vessels for instance, graduates, graduated cylinders, funnels and containers in general, where accurate volume is of importance much difficulty has been experienced in graduating the ware with absolute accuracy, due to the limitations of manufacture.

The object of the present invention is to produce glass articles of precise internal diameter and shape.

Another object is to obtain a proper fit between a glass bearing and its shaft.

Still another object is to facilitate the graduating of laboratory glassware such as graduates, graduated cylinders and the like.

The above and other objects may be accomplished by practicing my invention which embodies among its features fitting a tubular blank over a vertically disposed mandrel of predetermined size and shape, supporting the blank by its bottom on the upper end of the mandrel, progressively heating the blank and allowing it to sag down over the mandrel under the influence of gravity, allowing the mandrel to shrink and finally removing it from the glass after the latter has set.

In the drawing:

Fig. 1 is a vertical sectional view through a mandrel such as I prefer to use in practicing my invention;

Fig. 2 is a side view of a tubular blank prepared for mounting on the mandrel;

Fig. 3 is a side view of the mandrel showing the blank mounted thereon; and

Fig. 4 is a side view of the finished article.

Referring to the drawing in detail, a mandrel 10 having a tapered end 11 and a longitudinal bore 12 which opens at its upper end into a vent opening 13 is mounted in a suitable holder 14 so as to be rotated about its longitudinal axis which for the purposes of my invention should extend vertically.

A glass blank 15 which is of slightly greater internal diameter than the external diameter of the mandrel 10 is then placed on the mandrel so that its bottom 16 rests on the upper extremity of the mandrel as illustrated in Fig. 3.

Heat is then applied to the upper end of the blank by means of a burner 17 while the mandrel is rotated and this burner is so mounted that it may be moved up and down parallel with the axis of the mandrel. As the glass blank becomes softened by the application of heat it will sag down and conform to the shape of the tapered end of the mandrel whereupon the burner is lowered so as to soften the next adjacent portion of the glass and the operation is repeated with the burner progressively advancing toward the lower end of the mandrel until the blank has sagged sufficiently to conform to the exact shape and size of the mandrel. Upon removing the heat the glass sets about the mandrel before the latter has completely lost its heat and is still in a slightly expanded condition. When the mandrel has contracted to its original size it may be readily extracted from the glass leaving the latter with an absolutely accurate internal size and shape. After removal of the glass from the mandrel it may be cut to the desired length and finished by grinding or otherwise to form a bearing in which a shaft will run without, in any case, requiring lubrication.

In actual practice, I have found it advantageous to form the mandrel from a material having a relatively high coefficient of expansion such as copper and coating it with a material which resists oxidation such as chromium. This produces a mandrel which will give the desired finish to the glass and at the same time one which upon cooling may be readily extracted from the finished product. I also find that by revolving the mandrel at about 90 R. P. M. and using a gas, oxygen flame I am able to obtain a rapid heating of the glass blank and thereby obtain speed in production.

While I have described my invention as applicable to the manufacture of a simple article such as a tube, it will be readily understood that funnels, graduates and other articles of more complicated shape may be produced by the same method and with modified apparatus.

While in the foregoing I have shown and described the preferred embodiment of my invention, it is to be understood that minor changes in the construction, combination and arrangement of parts and in the actual method as practiced may be resorted to without departing from the spirit and scope of the invention as claimed.

What I claim is:

1. The method of making glass articles of accurate internal size and shape which includes supporting a preformed glass blank on the upper end of a vertically disposed mandrel, applying heat to the blank progressively from its supported end to its opposite end to cause it to soften and allow gravity to cause it to shrink and conform to the size and shape of the mandrel.

2. The method of making glass articles of accurate internal size and shape which includes supporting a preformed glass blank on the upper end of a vertically disposed mandrel, softening the blank progressively from its supported end to its opposite end, rotating the mandrel and shrinking the softened glass onto the mandrel through the action of gravity.

3. The method of making glass articles of accurate internal size and shape which includes supporting a preformed glass blank on a vertically disposed mandrel which has a greater coefficient of expansion than the blank, heating the blank and mandrel progressively from the supported end of the blank to its opposite end to cause the blank to sag under the influence of gravity and conform to the shape of the mandrel, allowing the mandrel to shrink away from the blank and removing the blank from the mandrel

JOHN F. MORSCHOLZ